US007630496B2

(12) United States Patent
Liimatainen

(10) Patent No.: US 7,630,496 B2
(45) Date of Patent: Dec. 8, 2009

(54) ARRANGEMENT AND METHOD FOR ADAPTING MOBILE FIELD DEVICE

(75) Inventor: Janne Liimatainen, Espoo (FI)

(73) Assignee: Tekla Corporation, Espoo (FI)

( * ) Notice: Subject to any disclaimer, the term of this patent is extended or adjusted under 35 U.S.C. 154(b) by 566 days.

(21) Appl. No.: 10/526,363

(22) PCT Filed: Sep. 1, 2003

(86) PCT No.: PCT/FI03/00636

§ 371 (c)(1),
(2), (4) Date: Mar. 2, 2005

(87) PCT Pub. No.: WO2004/021639

PCT Pub. Date: Mar. 11, 2004

(65) Prior Publication Data

US 2006/0023886 A1 Feb. 2, 2006

(30) Foreign Application Priority Data

Sep. 2, 2002 (FI) .................................. 20021562

(51) Int. Cl.
*H04K 1/00* (2006.01)
(52) U.S. Cl. ...................... 380/258; 380/270
(58) Field of Classification Search ................ 380/258, 380/270, 278, 277, 45, 269; 713/150, 160; 455/410
See application file for complete search history.

(56) References Cited

U.S. PATENT DOCUMENTS

| 5,243,652 | A | * | 9/1993 | Teare et al. | 380/250 |
| 5,754,657 | A | * | 5/1998 | Schipper et al. | 380/258 |
| 5,787,170 | A | * | 7/1998 | Op de Beek | 713/165 |
| 5,898,680 | A | * | 4/1999 | Johnstone et al. | 370/316 |
| 6,674,860 | B1 | * | 1/2004 | Pirila | 380/247 |
| 7,013,391 | B2 | * | 3/2006 | Herle et al. | 713/182 |
| 7,050,583 | B2 | * | 5/2006 | Montgomery | 380/37 |

(Continued)

FOREIGN PATENT DOCUMENTS

EP 0 997 808 5/2000

(Continued)

*Primary Examiner*—Eleni A Shiferaw
(74) *Attorney, Agent, or Firm*—Young & Thompson

(57) ABSTRACT

According to the invention, a field mobile terminal, such as a PDA, is adapted to a use. The mobile terminal is provided with data, which is divided into several parts. Each part concerns data connected to a certain area, and the data of each part has been encrypted by using a specific encryption key or keys. The provision of data is a preliminary step for adapting the mobile terminal and it may be done in an office of a public utility or a corresponding organization. A decryption key (or keys) is location specific. The decryption keys are in a special server. When a decryption of a part (or parts) is needed, the server finds out the location of the mobile terminal. This is done by asking for the location information from a special location information application in a communication network. The application utilizes the location information of the mobile network, which is updated in the wireless network system, such as in a GSM network. Alternatively, the location information of the mobile terminal may be delivered to the server automatically. A method according to the invention provides that the location service utilizes the location information on the mobile terminal, which location information is within the knowledge of the network.

14 Claims, 4 Drawing Sheets

U.S. PATENT DOCUMENTS

| | | | |
|---|---|---|---|
| 2001/0036271 A1 | 11/2001 | Javed | |
| 2001/0055392 A1* | 12/2001 | McDonnell et al. | 380/258 |
| 2002/0078361 A1* | 6/2002 | Giroux et al. | 713/183 |
| 2003/0070067 A1* | 4/2003 | Saito | 713/150 |

FOREIGN PATENT DOCUMENTS

| | | |
|---|---|---|
| WO | WO94/08408 | 4/1994 |
| WO | WO02/37246 | 5/2002 |

\* cited by examiner

ARRANGEMENT AND METHOD FOR ADAPTING MOBILE FIELD DEVICE

FIELD OF THE INVENTION

This invention relates to mobile field devices, such as field computers and maintenance devices. Especially, the invention relates to applications that run in the mobile field devices. Furthermore, the invention relates to an arrangement for adapting the mobile field device to a use.

BACKGROUND OF THE INVENTION

Public utilities, such as municipal electricity companies and water and sewerage utilities, (or corresponding private utilities) manage large and complex systems. The maintenance of the systems must be arranged efficiently. A traditional way, for example in a municipal electricity company, is that maintenance groups, which belong to the company's staff, know their area, and before performing tasks they go to the office of the company to get task lists and, if needed, necessary map sheets. If some unexpected tasks occur during the working day, the maintenance groups may be informed and instructed by using a radiophone, mobile phone, normal telephone, or even a fax. It may also happen that new map sheets must be picked up from the office. The control center can be informed about operations made in the field using the same ways. Alternatively, the operations can be written down on paper and transported to the office or the control center after the tasks are completed.

Some public utilities may use mobile field computers, such as PDAs (Personal Digital Assistant), for informing maintenance men in the field. However, the field computers must also be updated in the office for the use of the day, before performing the tasks. A limited amount of instruction data may be delivered to the field computer via wireless communication, but larger data amounts are impossible (or very unpractical) to transport since the capacity of the wireless communication path is limited. After the tasks are performed, the field computers may be transported to the control center for updating the system in accordance with the operations made.

FIG. 1 illustrates, by way of a map, a simple example of an energy distribution network in an area. Watercourses are marked with horizontal hatched lines and larger consumption areas with diamond hatched lines. Main roads are also illustrated on the map. The power lines 4 are marked with dashed lines, switching stations 2 with circles, and supply transformers 3 with triangles. The generator 1 is marked with a circle with an amplitude current mark. It can be induced from the map that the distribution network comprises a great number of different elements with their attributes and parameters. For example, the energy distribution network of a city of about one million inhabitants may comprises 1.2-1.3 million targets (elements). The data amount, which is needed to describe a network of this size, is approximately over 100 Mbytes.

Nowadays, a trend is that public utilities externalize, for example, maintenance tasks. One company in the maintenance business may manage the maintenance of a very large area and/or of several areas, whereby the maintenance men do not any more know their areas and the networks. However, the maintenance men work the same way as before: they pick up their duties before starting to work and transport information about the operations made after the work. A problem is that the owner of the public utility (or corresponding private utility) may not desire to give all network information to the maintenance man of the external company. On the other hand, the external maintenance company may desire to use the same field devices, so it may happen that the device may contain information from several different utilities. The security of information is not as guaranteed as when the maintenance men were in the service of the utility. And as mentioned before, the huge amount of data of the systems is also a problem.

The goal of the invention is to alleviate the above-mentioned problems. This is achieved in a way described in the claims.

SUMMARY OF THE INVENTION

According to the invention, a field mobile terminal, such as a PDA, is adapted to a use. The mobile terminal is provided with data, which is divided into several parts. Each part concerns data connected to a certain area, and the data of each part has been encrypted by using a specific encryption key or keys. The provision of data is a preliminary step for adapting the mobile terminal and it may be done in an office of a public utility or a corresponding organization. A decryption key (or keys) is location specific. The decryption keys are in a special server. When a decryption of a part (or parts) is needed, the server finds out the location of the mobile terminal. This is done by asking for the location information from a special location information application in a communication network. The application utilizes the location information of the mobile network, which is updated in the wireless network system, such as in a GSM network. Alternatively, the location information of the mobile terminal may be delivered to the server automatically.

If the location information of the mobile terminal and the location information of one of said decryption keys matches, the decryption key is sent from the server to the mobile terminal preferably via a wireless communication path. The mobile terminal may now decrypt the data part in question for adapting the terminal for the use required.

BRIEF DESCRIPTION OF THE DRAWINGS

In the following, the invention is described in more detail by means of FIGS. 1-4 in the attached drawings where.

DETAILED DESCRIPTION OF THE INVENTION

Figure 1:
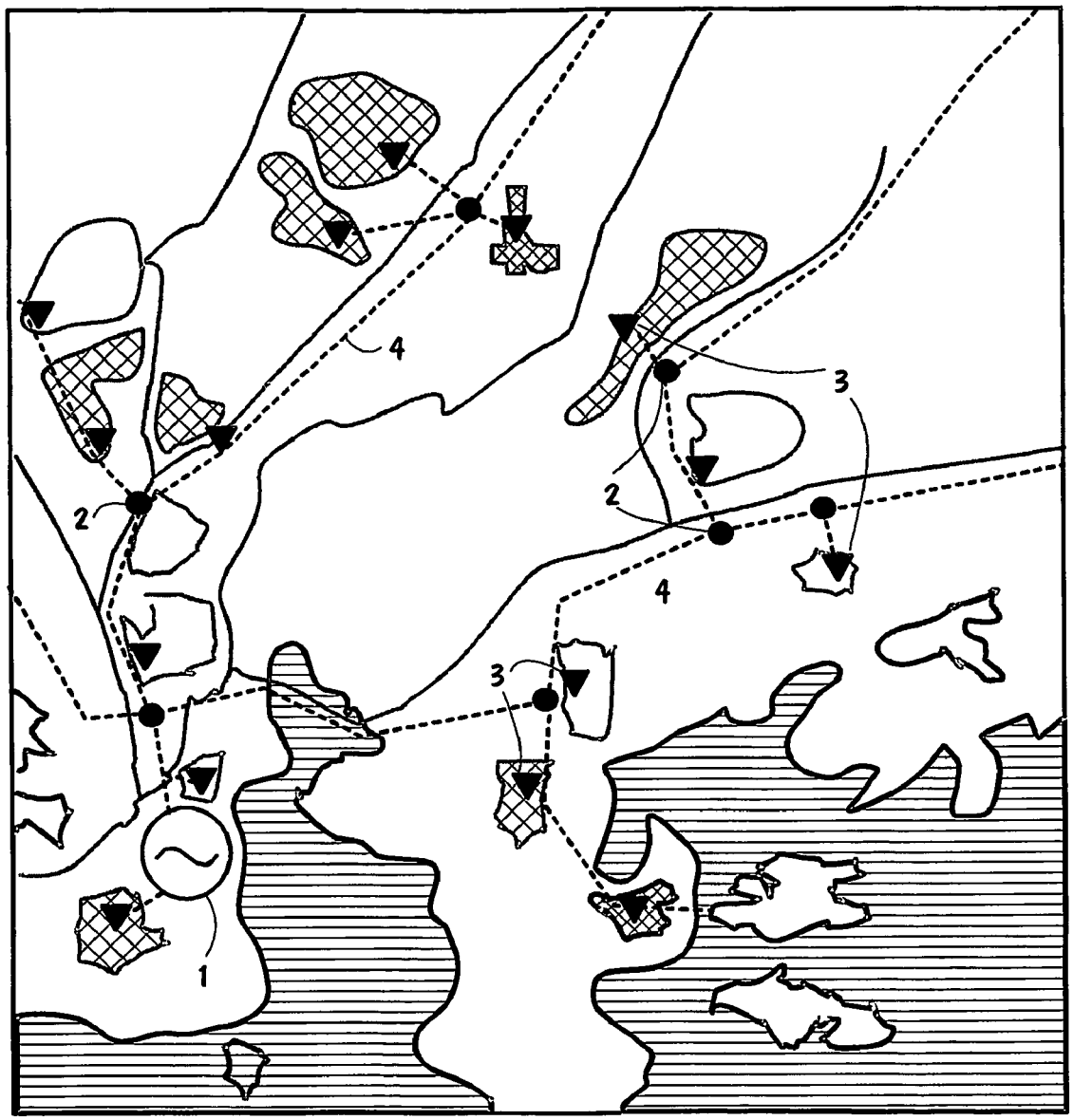
FIG. 1 illustrates, by way of a map, an example of an energy distribution network in an area level.

Suitable data and software must be set up in the mobile field terminal, which can, for example, be a field computer, mobile maintenance device, a PDA, or a mobile phone, to adapt it for use. Lets examine an example of a power distribution network illustrated in FIG. 1. If the network information is utilized in an efficient and inventive way according to the invention, it must be divided into several parts. Preferably, the division may be based on geographical areas, such as rectangles in a map or other geographically logical areas (valleys, mountains etc.), but it may also be based on the structure of the distribution network—the area of a distribution substation may be a part. However, each part has always some location in a geographical map.

Figure 2:
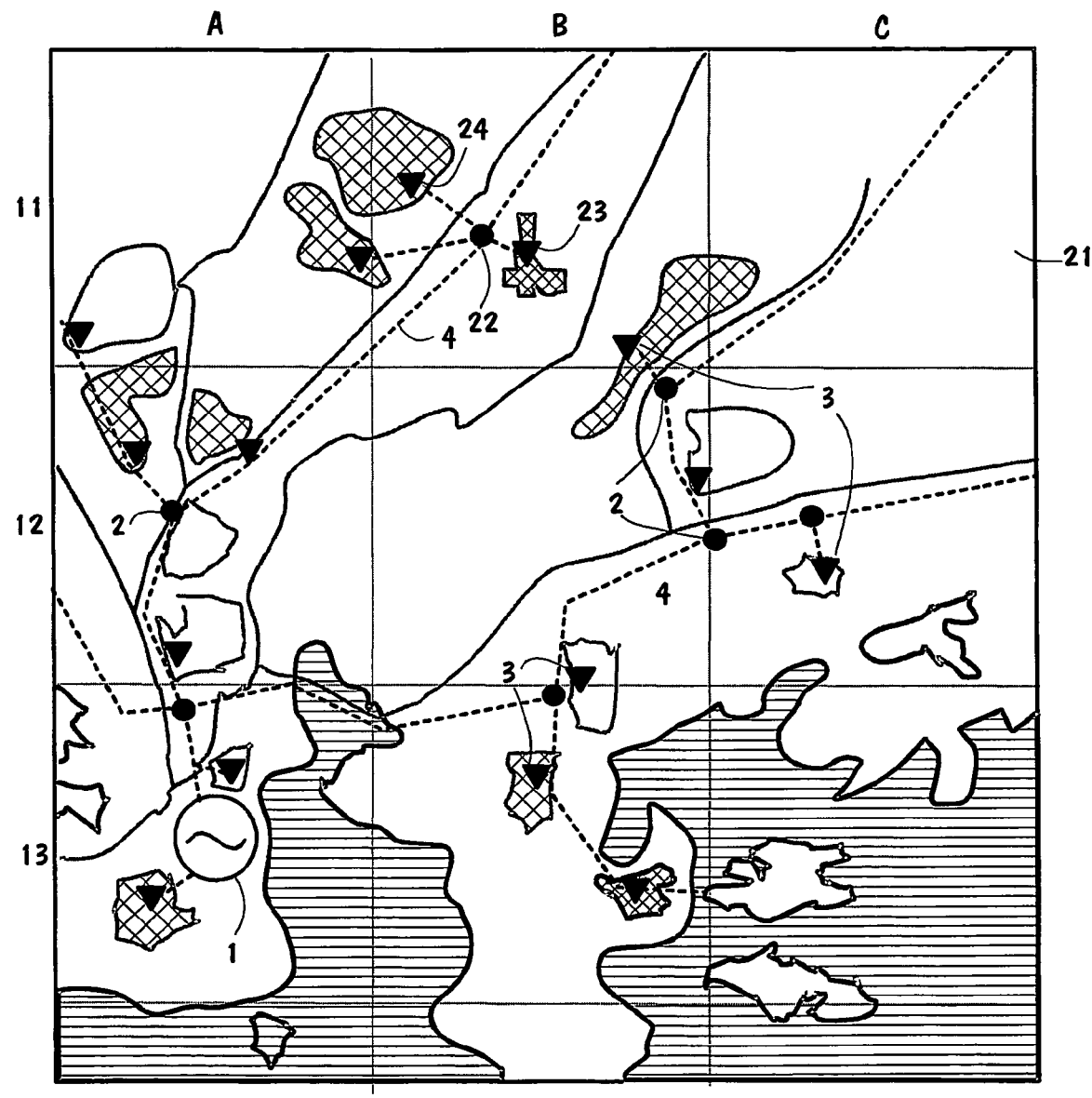
FIG. 2 illustrates, by way of a map, an example of dividing the data of an energy distribution network into parts, which are location specific.

FIG. 2 shows, by way of a map, an example of the division of the power distribution network based on the rectangles 21. For example, rectangle B11 contains the information from one switching station 22, two supply transformers 23, 24, and the distribution lines 4 in the area of the rectangle. When maintenance men are in the area of B11 for performing their tasks, they do not usually need information from the other parts of the network—just the information from part B11. The maintenance men carry the mobile field terminal, which contains all information from the distribution network, but only the information of part B11 is accessible. The maintenance men can do their tasks in the area of B11, and receive new tasks and send performed tasks to the control center via a wireless communication path. When they move to another area, for example, to part A12, the decryption key of the new area is accessible from the server, but the key of the old area B11 is no longer accessible. In this way, the mobile terminal is always adapted to the use in question.

The divided (and encrypted) information of the distribution network is downloaded to the mobile terminal from a server, which contains the information of the distribution network. Naturally, the server and the mobile terminal are connected to each other during the download. The connection can be a cable connection, a connection through a fixed network, or even a connection through a wireless network. However, if the connection is through a wireless network, the time required for the download is very long depending on the low transmission capacity of the wireless network and the huge data amount of the network. The wireless solution may be reasonable at nights. It may be also needed to download special software for using and utilizing the network information.

Each part of the network information has been encrypted by a part specific key (or keys if the encryption is based on several keys). Also the special software may be divided, according to the division of the information, into parts, and encrypted as well. When maintenance of a certain network element in a certain area (part) requires special software, it is accessible at the same time as the information needed. The encryption may be based on key pairs and enough long bit codes etc.

The encrypted information parts (and the pieces of software) make it possible that only the part or parts needed are accessible to the maintenance men. Decryption is needed for accessing the information needed. Since the encrypted information is connected to a certain area, i.e. location, the decryption key or keys are location specific. The encryption mechanism may be utilized as key pairs. (Other ways are possible as well.) i.e. the encrypting key and decrypting key of a certain part perform as a key pair. The decryption keys are not in the mobile terminal, but they are in a special server from which they have to be transported to the mobile terminal. In order to deliver the decryption key or keys needed, the location of the mobile terminal must be determined. When the location of the mobile terminal and the location information of the decryption key matches, the decryption key is transported to the mobile terminal wirelessly. In other words, the decryption key or keys, corresponding to the location of the mobile terminal, are transported to the terminal for decrypting the information (and the piece of software) of the part of that location. When the terminal moves away from the area the decryption key in the server may again become inaccessible. (The key is not delivered to the mobile terminal.) based on the location information that the mobile terminal gets from the network system (the network system has to known the location of the mobile terminal).

Figure 3:
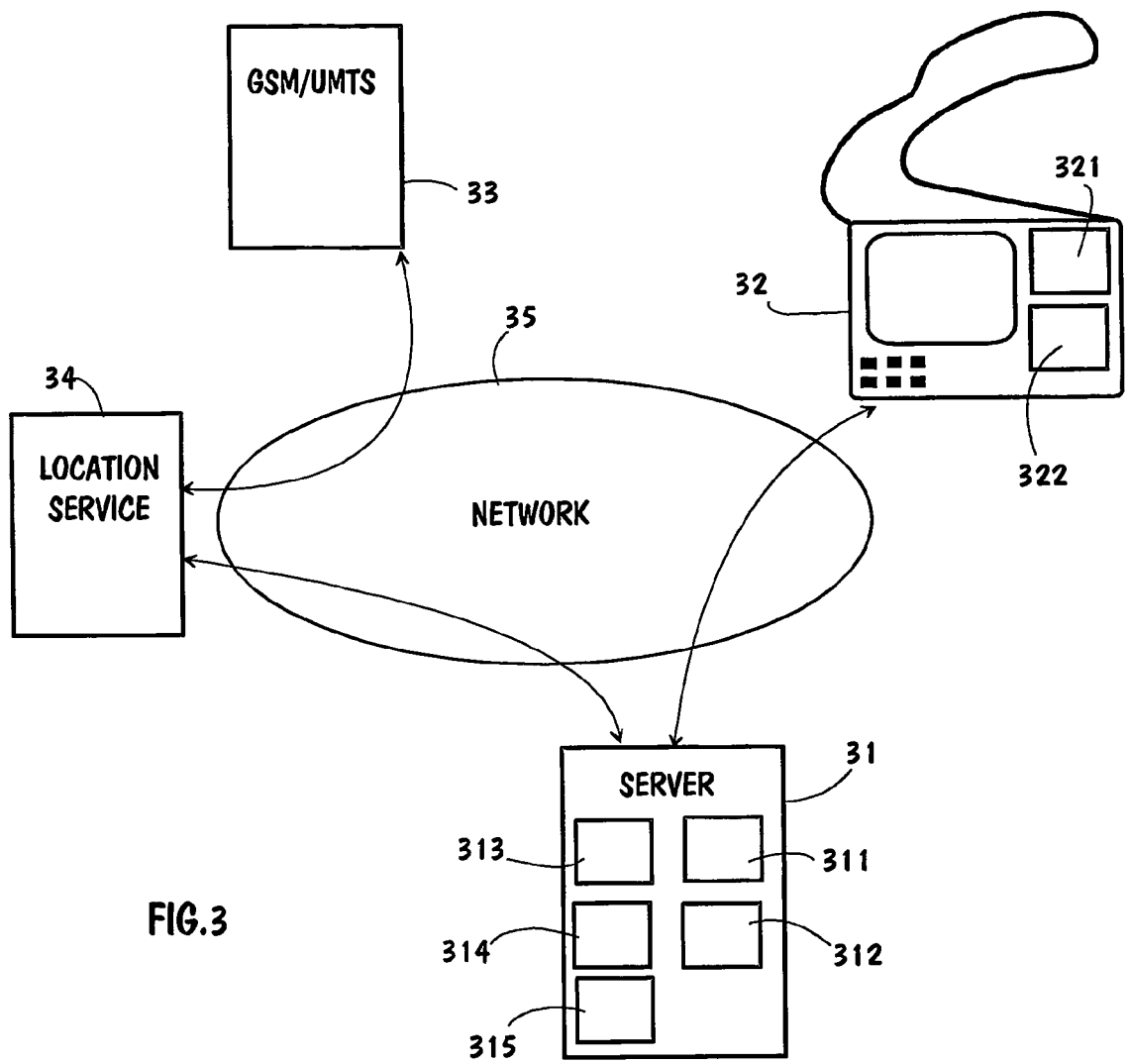
FIG. 3 illustrates an arrangement according to the invention.

FIG. 3 shows an example of an inventive arrangement. The server 31, wherein the decryption keys 311 lie, preferably finds out the location of the mobile terminal 32 from a location service 34 via a network 35. The location service utilizes the location information system 33 of the network to which the mobile terminal is connected, normally wirelessly. A very common system is the use of the location information system of the mobile network, such as GSM or UMTS. So the location service gets location information from the location information system.

The server asks for the location information of the mobile terminal from the location service. As a response to this enquiry, the location service transports the location information. Alternatively the server may ask for the location information from the mobile terminal itself, but this is not a recommended way, since it is not so secure. (The mobile terminal should get its location information from the location information system 33 since the location information from the mobile terminal may be a fake.) It is also possible that the location service (or the mobile terminal) automatically, without any request, transports location information to the server, so that the server always knows the locations of the mobile terminals that are under its service.

A preferable way is that the mobile terminal asks for a decryption key (or keys) from the server, which, as a response, finds the location of the mobile terminal, searches the right decryption key, and transports it to the mobile terminal. Naturally, in the case of an automatic delivery, no request is needed to be sent from the mobile terminal.

The mobile terminal comprises means 321 for decrypting the part/s needed using the decryption key or keys. Further, the mobile terminal comprises means 322 for adapting the mobile terminal for the use. This means that not only the decrypted information of the part is saved in the mobile terminal, but also the software needed, and maybe related functions, are installed. Furthermore, the mobile terminal may comprise means for requesting the decryption key or keys from the server.

The server comprises the decryption keys 311, as mentioned before, and means 312 for providing the mobile terminal with data, which is divided into several parts, each part concerning data connected to a certain area, and said data of each part encrypted by a location specific key. The providing means are connected to the mobile terminal for the duration of the provision of data. Naturally the providing means may be in another element than the server. Further, the server comprises means 313 for finding out the location of the mobile terminal, means 314 for comparing the location information of the mobile terminal and the location information of said decryption keys, and selecting that decryption key (or keys) whose location information and the location information of the mobile terminal match, and means 315 for sending the selected decryption key (or keys) from the server to the mobile terminal as a response to the actions of the comparing and selecting means 314.

Further, the means for finding out location information may comprise means for requesting the location information of the mobile terminal from a location service that is in connection with the server through a communication network, or from the mobile terminal, and means for receiving the requested information.

Figure 4:
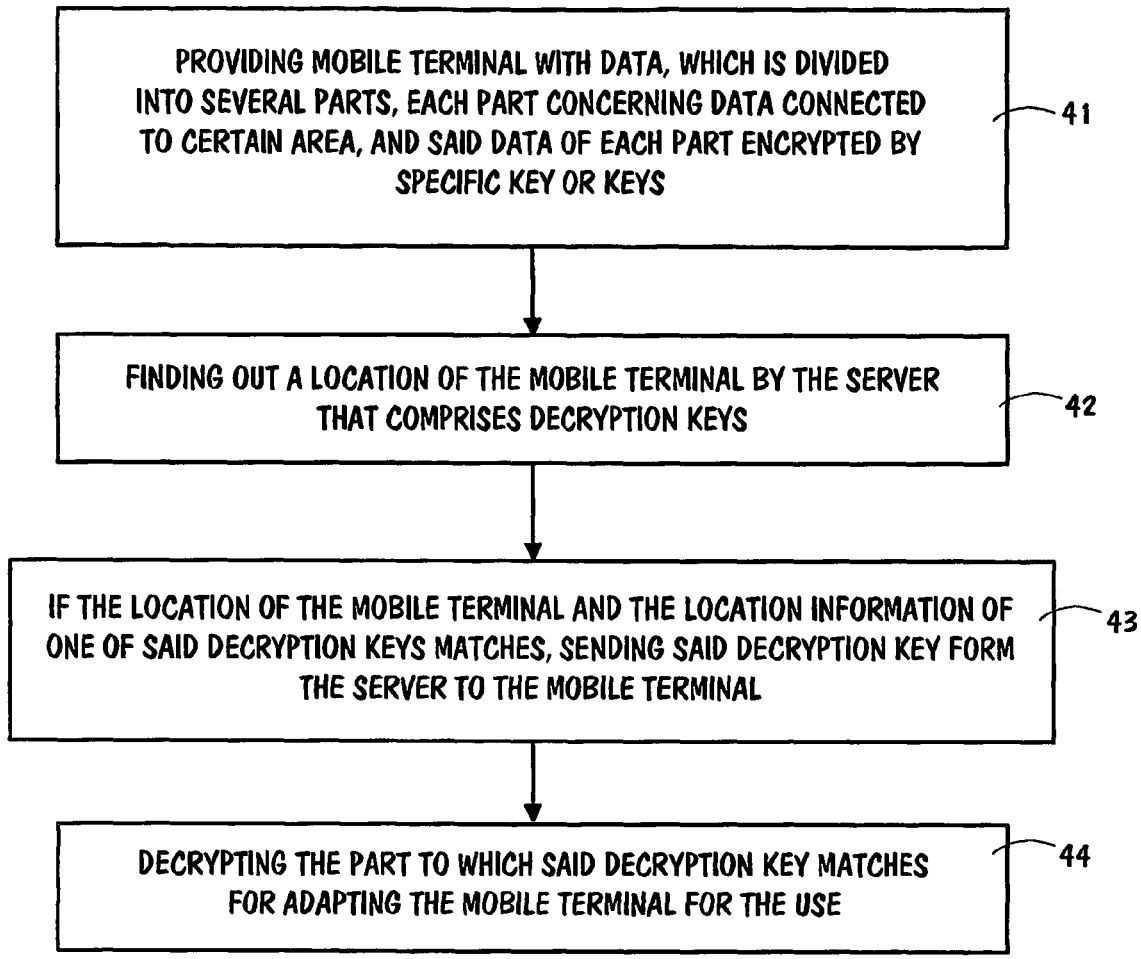
FIG. 4 illustrates a flow chart that shows an example of the inventive method.

FIG. 4 shows an example of the inventive method in a flow chart form. First the mobile terminal is provided, in step 41, with data, which is divided into several parts, each part concerning data connected to a certain area, and said data of each part encrypted by a specific key or keys. When the mobile terminal has been provided with the information (and software) according to the invention, the next step is taken for adapting the terminal for the use, preferably for the current use. The server finds out, in step 42, the location of the mobile terminal. In this step, the server may ask for the location information preferably from the location service, or the location information may be transported to the server automatically. As mentioned, the server comprises the location specific decryption keys. If the location information of the mobile terminal and the location information of one of said decryption keys matches, said decryption key or keys are sent, in step 43, from the server to the mobile terminal. In the mobile terminal, the part to which said decryption key matches is encrypted in step 44. And as mentioned, the adaptation of the mobile terminal may contain other tasks along with the decryption function.

It should be noted that location information need not necessarily be the only criteria to check the validity to transport the decryption key from the server to the mobile terminal. Along with the location information, the decryption key may also be associated with the identification of the mobile terminal and/or time information. In this way, it is possible to classify users in more detail and to increase the security of the data. For example, if the mobile terminal belongs to a certain subcontractor, it may be desirable to give him only a certain part of the information. It may also desired that the information of the parts is accessible only during a certain period, then time information is needed for the decryption function: the information may be decrypted in day time, but not in evenings or at nights for example. Naturally, combinations of different criteria may be used.

The decryption function may not be restricted to one part of the information, but it may be useful that several parts are also decrypted at the same time. For example, if the maintenance men are in the area of B11 in FIG. 2, and the server has this location information, the maintenance men may be allowed to get an access to the parallel parts of B11 as well, i.e. to parts A11, C11, A12, B12, and C12. This is convenient to arrange by transporting the decryption keys of the parallel parts with the decryption key of B11.

The invention makes it possible to use external maintenance companies in a safe way. The security of the information of a public utility (or private utility or another company) is high, since the information itself is not transported over a wireless communication path, but only the decryption key or keys of the information allowed to be used, is transported. A subcontractor has access only to the information needed for his duties. Anyway, wireless transmission of huge data amounts requires an unacceptable long period and is expensive as well. So, the invention saves the transmission capacity of the communication network as well and is an economical solution. It is also relatively safe to ask for location information from a special location service. The alternative is to ask the location information from the mobile terminal, but then the security level is lower. So, the information is very quickly in the use of the subcontractor in a secure way.

Decryption keys allow various different solutions. A number of keys may concern the same area. One key decrypts a small subarea, another key a larger area, etc. Or one key decrypts certain information in the area and another key other information. The decryption keys of several areas may be delivered at the same time, or several keys are needed for decrypting one area.

One application of the invention may be that when using the identification information of the mobile terminal along with the location information, certain sensitive information in the part may be decrypted separately from the main decryption of the part of the information. The sensitive information is allowed only to the certain terminal or terminals. Other terminals can decrypt the information of the part, but without the sensitive material. As noted, the invention is for professional use, concerning maintenance actions of an organization, such as different public utilities. It is evident that the invention can be used in other ways than described in this text, so it can be used in many different solutions, in the scope of the inventive idea.

The invention claimed is:

1. A method for providing a mobile terminal with location-specific decryption keys in a communication system comprising at least a communication network and a location service in the communication network, the location service providing location information on several mobile terminals, the method comprising at least:
   storing location-specific decryption keys in a server;
   providing the mobile terminal with data divided into several parts, each part concerning data connected to a certain area, and the data connected to the certain area being encrypted at least by a location-specific decryption key;
   requesting, by the server, location information of the mobile terminal from the location service, the location service being configured to utilize said location information from a mobile phone network;
   receiving, at the server, the requested location information, the location information being sent from the location service in the communication network directly to the server so that the location information does not pass via the mobile terminal;
   checking whether or not the received location information matches a location information of one of said location-specific decryption keys; and
   sending said location-specific decryption key to the mobile terminal upon the received location information matching the location information of said location-specific decryption key.

2. The method according to claim 1, wherein the location-specific decryption key is sent in response to receiving from the mobile terminal a request for the location-specific decryption key.

3. The method according to claim 1, further comprising:
   performing a step of said checking and a step of said sending automatically by utilizing said location information.

4. The method according to claim 1, wherein the location service utilizes the location information of the mobile terminal, which location information is within knowledge of the communication network.

5. The method according to claim 1, further comprising:
   checking identification information of the mobile terminal along with the received location information before sending the location-specific decryption key to the mobile terminal.

6. The method according to claim 1, further comprising:
   checking time information along with the received location information before sending the location-specific decryption key to the mobile terminal.

7. The method according to claim 1, further comprising:
   checking identification information of the mobile terminal and time information along with said received location information before sending the location-specific decryption key to the mobile terminal.

8. The method according to claim 1, further comprising:
   transporting location-specific decryption keys for more than one of the parts of the data to the mobile terminal.

9. A system for adapting a mobile terminal to a use in a communication system comprising at least a communication network and a location service in the communication network, comprising:
- first means for providing data divided into several parts, each part concerning data connected to a certain area and the data connected to the certain area being encrypted by a location-specific decryption key;
- a server arranged to be in connection with the location service through the communication network, the server comprising location-specific decryption keys;
- second means for determining location information of the mobile terminal from the location service in the communication network by requesting said location information and receiving the requested location information directly from the location service;
- third means for comparing the received location information with a location information of said location-specific decryption keys, and selecting said location-specific decryption key whose location information matches the received location information; and
- fourth means for sending the selected location-specific decryption key to the mobile terminal, and being responsive to said third means,
- wherein the mobile terminal is connectable to the first means for providing the mobile terminal with said data divided into several parts,
- wherein the mobile terminal comprises fifth means for adapting the mobile terminal for a use by decrypting a part by using the location-specific decryption key, and
- wherein the location service is configured to utilize said location information from a mobile phone network.

10. The system according to claim 9, wherein the mobile terminal further comprises sixth means for requesting said location-specific decryption key from the server.

11. The system according to claim 9, wherein the location-specific decryption keys are further associated with at least one of time information and identification information of the mobile terminal, to be used along with said location information when said location-specific decryption key is selected.

12. The system according to claim 9, wherein the mobile terminal is one of a group comprising a field computer, a PDA and a mobile phone.

13. The system according to claim 9, wherein said fourth means is further configured to send, in response to said third means, said location-specific decryption keys for more than one of the parts.

14. A server for adapting a mobile terminal to a use in a communication system comprising at least said mobile terminal, a communication network and a location service in the communication network, the server comprising:
- location-specific decryption keys stored thereon;
- first means for finding out location information of the mobile terminal from the location service by requesting said location information and receiving the requested location information directly from the location service so that the location information does not pass via the mobile terminal;
- second means for comparing the received location information and a location information of said location-specific decryption keys, and for selecting a location-specific decryption key whose location information matches the received location information; and
- third means responsive to the second means, for sending the selected location-specific decryption key to the mobile terminal,
- wherein said server is configured to be connectable to the location service via the communication network,
- wherein location server is configured to utilize said location information from a mobile phone network,
- wherein the mobile terminal is configured to receive encrypted data divided into several parts, each part associated with a certain area, and
- wherein the mobile terminal comprises fourth means for adapting the mobile terminal for a use by decrypting a part by using the location-specific decryption key.

* * * * *

UNITED STATES PATENT AND TRADEMARK OFFICE
CERTIFICATE OF CORRECTION

PATENT NO.        : 7,630,496 B2                                        Page 1 of 1
APPLICATION NO. : 10/526363
DATED             : December 8, 2009
INVENTOR(S)       : Janne Liimatainen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Twenty-first Day of December, 2010

David J. Kappos
*Director of the United States Patent and Trademark Office*